March 20, 1928.  
C. B. COMSTOCK  
1,663,118  
BAKER'S OVEN AND MEANS FOR CONTROLLING THE HEATING THEREOF  
Filed May 23, 1927    3 Sheets-Sheet 3
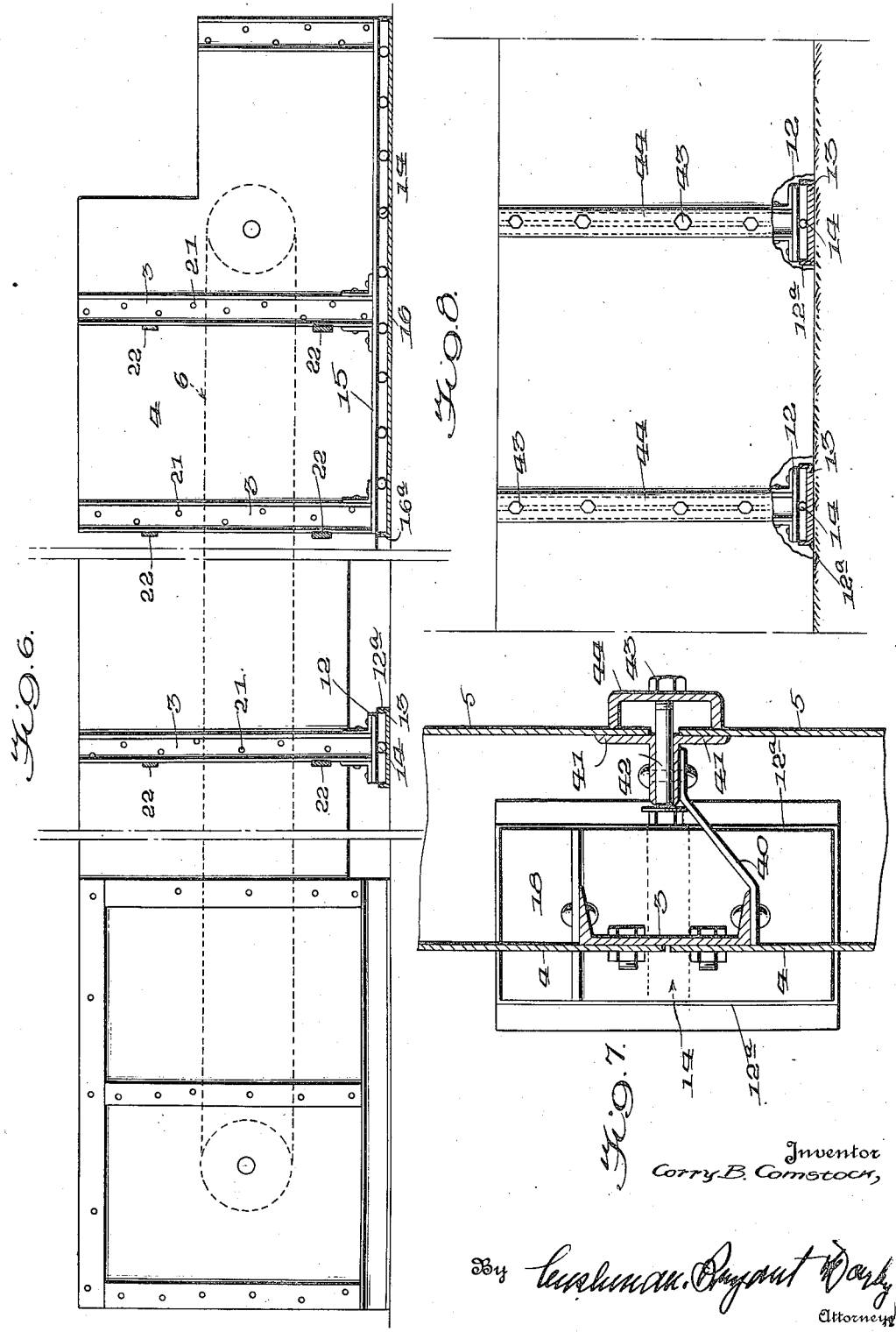
Inventor  
Corry B. Comstock,  
By Cushman, Bryant Darby  
Attorneys Patented Mar. 20, 1928.

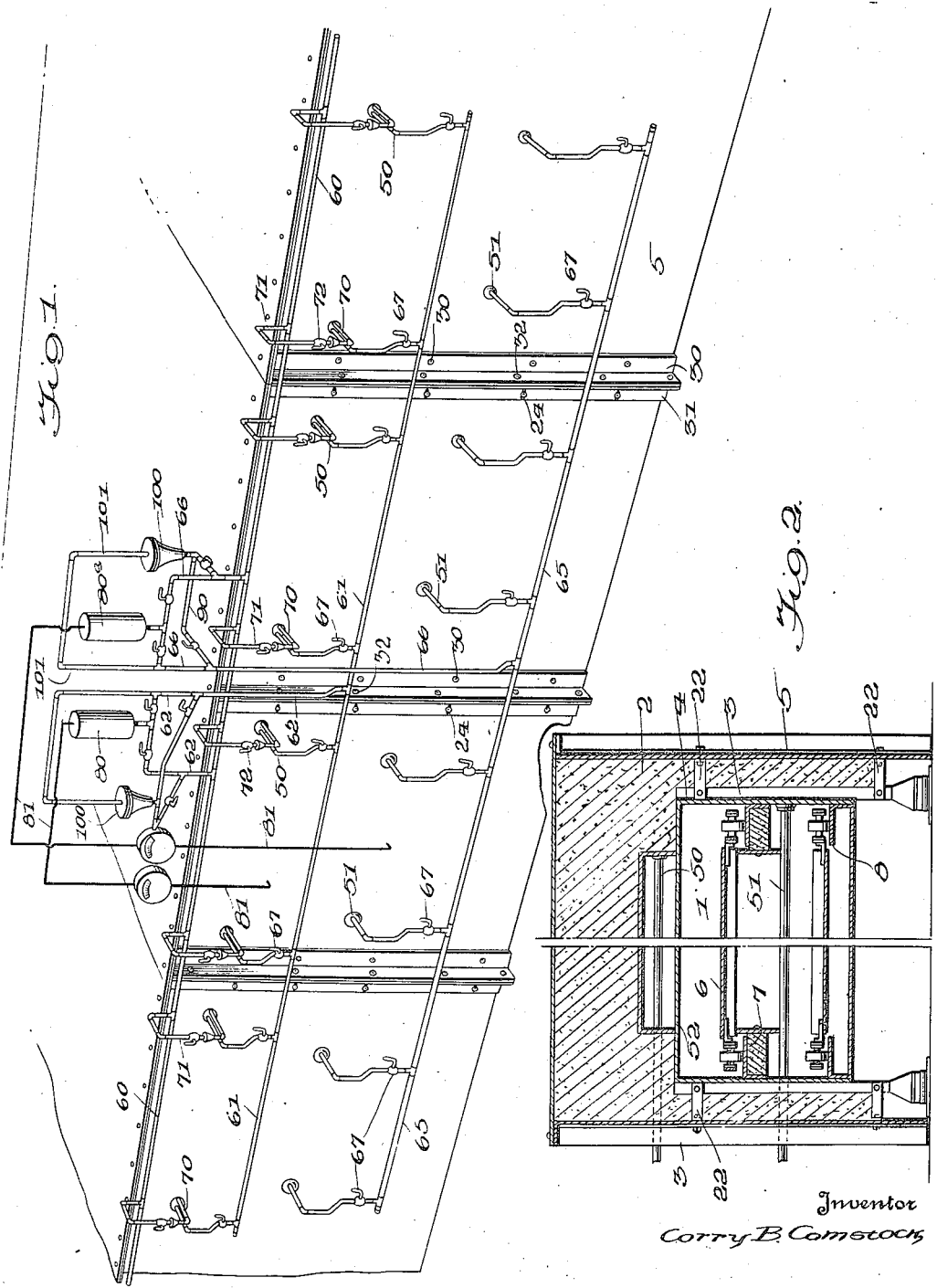

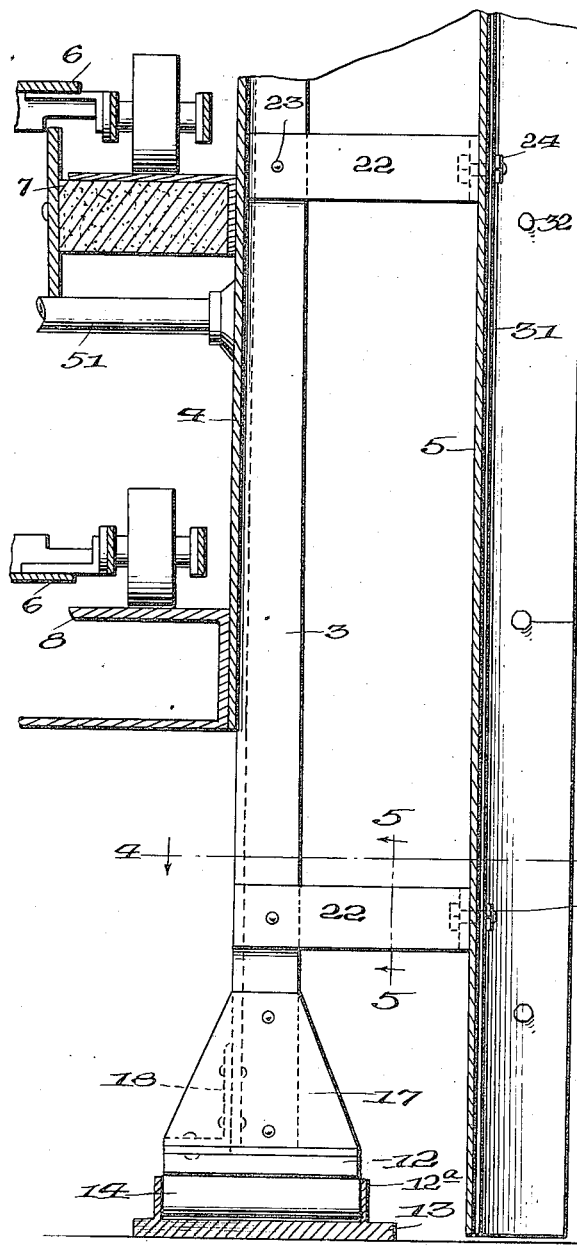
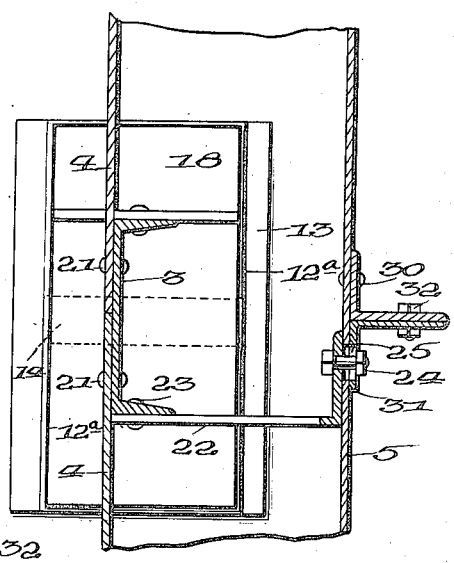
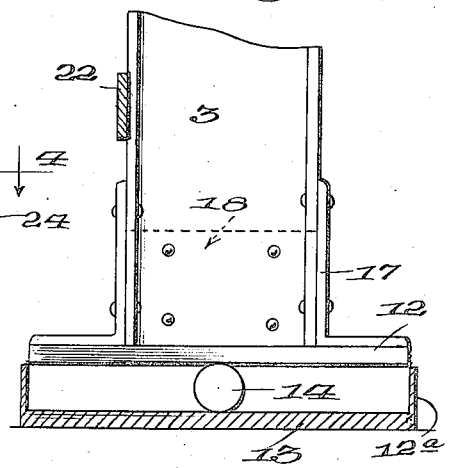

1,663,118

UNITED STATES PATENT OFFICE.

CORRY B. COMSTOCK, OF NEW YORK, N. Y., ASSIGNOR TO COMSTOCK OVEN COMPANY, INC., OF NEW YORK, N. Y., A CORPORATION OF NEW YORK.

BAKER'S OVEN AND MEANS FOR CONTROLLING THE HEATING THEREOF.

Application filed May 23, 1927. Serial No. 193,538.

The present invention relates to improvements in bakers' ovens particularly of that type which comprises a horizontally elongated baking chamber having metal walls, and through which the articles to be baked are transported by an endless conveyor.

The principal object of the invention is to provide an oven of the character referred to in which provision is made for compensating for the difference in expansion of the inner and outer walls when the oven is in use.

Another object of the invention is to provide such an oven, the length of which may be readily increased as desired.

Another object of the invention is to provide means for accurately regulating or controlling the heating of the baking chamber whereby the flow of gas to the burners is controlled by the temperature of the particular section of the chamber in which the burners are located, and by which the amount of gas supplied to the burners will be accurately regulated so that there will be no loss or waste.

With the foregoing and other objects in view, the invention consists in the construction and arrangement of parts that will be hereinafter more particularly pointed out and described, reference being had to the accompanying drawings in which:

Figure 1 is a perspective view, of a portion of a baker's oven embodying the present improvements.

Figure 2 is a transverse vertical section through the oven.

Figure 3 is a vertical sectional view of an enlarged scale through one of the side walls of the oven.

Figure 4 is a horizontal section substantially on the line 4—4 of Figure 3.

Figure 5 is a detail elevation, partly in section on the line 5—5 of Figure 3.

Figure 6 is an elevation of one side of the oven, the outer wall being removed.

Figure 7 is a view similar to Figure 4 illustrating a slightly modified form of connection between the inner and outer side walls.

Figure 8 is a side elevation of a portion of the oven constructed as in Figure 7.

Referring to the drawings, in the several figures of which like reference characters denote corresponding parts, it will be seen that the oven is formed of a plurality of sections arranged end to end, each including double walls of sheet metal surrounding an elongated baking chamber 1, the space between said metal walls being filled with a suitable heat insulation 2.

The side walls of each oven section comprise suitable metal columns or uprights 3, preferably of channel form in cross section, and inner and outer side walls 4 and 5, preferably formed by metal plates connected to the columns or uprights as hereinafter more particularly described.

Within the baking chamber 1, is mounted a suitable endless conveyor 6, supported to travel on tracks 7, 8 to convey the articles being baked longitudinally through the chamber.

Preferably, each of the oven sections is about five feet in length, and each of such sections includes at least one of the columns 3 at each side thereof.

By this arrangement, an oven of any desired length may be initially constructed and, if desired, the length can be increased or diminished by adding or removing sections.

The delivery end section of the oven is immovably secured in position on a suitable supporting base or floor, whereas the other sections are so supported that they are permitted to move in the direction of the length of the oven as the walls thereof become heated.

To permit this relative movement between the immovable delivery end section and the other sections, in the embodiment of the invention illustrated, each of the columns 3 of the movable sections is provided with an expanded base including a bottom plate 12 and between such base plates and suitable floor plates 13, are arranged anti-friction rollers 14. These rollers 14 support the weight of the oven and permit the sections supported thereby to move relative to the fixed section in the direction of the length of the oven as the walls expand or contract. As shown, the base plates 12 are surrounded by rim-like walls 12ª, which rest on or are secured to and rise from the floor plates 13. This wall 12ª provides a space within which the rolls 14 may have a limited movement and prevents the insulation material 2 from interfering with the movement of the oven sections hereinafter referred to.

If preferred, instead of providing a separate plate 12 beneath each column 3, a plate 15 common to a plurality of such columns may be provided as indicated at the feed end of the oven in Figure 6, a series of rollers 14 being arranged between such plate and an elongated floor plate 16. The plate 16 supports a short vertical wall 16ª, similar to the walls 12ª before referred to.

The base plate 12 can be secured to the foot of each column 3 by any suitable means, such as the angle brackets 17, 18.

The inner side walls 4 are formed by metal plates secured directly, as by rivets 21, to the inner faces of the columns 3 and the outer side walls 5 consist of plates which are supported from the channels 3 by means permitting relative movement between said channels and plates so that the inner walls and supporting columns, which will necessarily become more highly heated than the outer walls may move relative to said outer walls without distorting or otherwise affecting the latter.

As shown, a plurality of arms 22 are secured by rivets or similar fastening means 23 to one of the side flanges of each channeled column 3 and extend outward from said columns.

The outer ends of the arms 22 are bent to lie close against the inner faces of the plates forming the outer oven wall 5, and bolts 24 extend through said arms and slots 25 formed in the outer wall plates. By this arrangement, while the plates of the outer wall 5 are held at fixed distances from the inner wall plates 4, the arms 22 and connecting bolts 24 may move in the slots 25 to accommodate the greater expansion of the inner oven walls.

In the embodiment of the invention illustrated in Figure 4, angle plates 30, 31 are secured to the outer faces of adjacent plates of the wall 5, said angle plates abutting and being connected by bolts or rivets 32.

Suitable slots are formed in the members of the angle plates 31 which contact with the wall 5 in alignment with the slots 25 and the securing bolts 24 extend therethrough. By this means while the plates of the outer oven wall are connected throughout the length of the oven so that all of the sections, except the immovable delivery end section, may move together relative to said immovable section, it is possible for the inner wall and uprights to have a limited movement relative to the outer wall.

In Figures 7 and 8, there is illustrated a slightly modified construction or form of connection between the columns 3 and plates 5 of the outer side wall of the oven.

In this form, each arm 40 is provided at its outer end with an abutment which contacts with the inner face of the outer oven wall and means are provided whereby said wall is clamped against said abutments.

As shown, the abutment 41 includes a member which is rigidly secured to the arm 40 and provides a bearing for a clamping bolt 42, that extends outward between the edges of adjacent plates of the outer oven wall 5. The outer terminal portion of the bolt 42 is exteriorly threaded and a nut 43 secured thereon holds a closure member 44 in clamping relation to the oven wall. The pressure of the closure members 44 maintain the outer oven plates in the desired close relation to the abutments 41, but these parts are not so rigidly connected that there cannot be a limited amount of relative movement between said parts to accommodate different degrees of expansion of the inner and outer oven walls.

The plates forming the top and bottom of the baking chamber are suitably connected with the inner side walls 4 and the outer top is connected to the walls 5.

While various means may be provided for heating an oven constructed as hereinbefore described, the present embodiment of the invention contemplates the use of gas for this purpose, and among the objects of the invention are to control, or regulate the burners so that the desired temperature may be maintained and waste of gas avoided when the oven is not operating.

In the drawings, there are illustrated two sets of burners 50, 51 located respectively, above and below the upper, operative, run of the endless conveyor 6.

The upper burners are preferably separated from the body of the baking chamber by the metal top or baffle 52, said burners being arranged in compartments which can be readily ventilated and by which the products of combustion from such burners are prevented from entering directly into the baking chamber.

Each set of burners is divided into a plurality of groups, each including one or more burners and means are provided for effectively controlling the supply of gas to each of these groups.

Referring particularly to Figure 1, 60 designates a main gas supply pipe which extends substantially throughout the length of the oven. Each of the burners of one of the groups of the upper set 50 is connected to a header 61, which is connected to the main 60 by a pipe 62. Similarly, all of the burners of each group of the lower set 51 are connected to a header 65 through a branch pipe 66. As shown, each burner is, as usual, provided with a manually operative valve or cut off 67, and there is preferably associated with each of the upper series of burners a pilot light 70, which has a direct connection 71 with the main supply pipe 60. A manually operative valve 72 is provided for controlling the supply of gas to each pilot light.

In the connection between the main supply pipe and each header 61, 65, there is arranged a thermostatically controlled valve by means of which the flow of gas to that header will be automatically varied in accordance with variations in the temperature in the section of the baking chamber within which the burners supplied by said header are located. The mechanism of such thermostatically controlled valve is illustrated merely diagrammatically in the accompanying drawing, in which 80 represents a solenoid that is connected to said valve controlling the upper header 61 of each group of burners and 80ª the solenoid of the corresponding valve of the header 65 of the corresponding lower group of burners, and 81 designates a portion of the circuits connecting the solenoids with suitable thermostats within the oven.

Means are also provided whereby when either of the thermostatically controlled valves has been actuated to cut off the supply gas to the header connected with its supply pipe, 66 for example, a uniform pressure will be maintained on all the burners of the group supplied by said header. This means includes a by-pass 90 which connects portions of the supply pipe (66 for example) at the opposite sides of the thermostatically controlled valve and an automatically acting valve in such by-pass. As diagrammatically illustrated in Figure 1, this automatic mechanism includes a diaphragm actuated valve located in a casing 100 mounted on the by-pass 90 and the upper portion of which casing is connected by a pipe 101 with the header supply pipe 66 beyond the valve controlled by the solenoid 80ª.

Normally, the valve actuating diaphragm in the casing 100 will be exposed to the same pressure as that in the main 60, and header 65 so that said valve will be closed and the gas will flow to the header 65 and burners connected therewith through the conduit 66. If in the operation of the oven, the heat in the section thereof within which the burners connected to the header 65 are located exceeds a predetermined degree the solenoid 80ª will be energized and the valve controlled thereby actuated to cut off the flow of gas from the main to the header 65.

As the pressure in the header falls the valve controlled by the diaphragm in the casing 100 will be actuated by a suitable spring to admit gas to the header through the by-pass 90.

The valve controlling means in the casing 100 can be such that a uniform pressure less than that in the main 60 can be constantly maintained in the burners when the thermostatically controlled valve has been operated to cut off the direct connection between the burner header and main regardless of the number of burners which are in use.

Preferably the mechanism in the casing 100 will be such that a pressure of approximately one half a pound will be maintained in the burners of the group or groups that are temporarily cut off from the direct pressure of the main.

It will be understood that while the foregoing description has referred particularly to the burners connected to a lower header 65 the action as regards the upper header of each group will be the same.

By such a control means the action of the groups of burners in different sections of the oven is more or less independent of the others and the temperature of every section can be readily varied as desired.

By closing the manually operable valves in the by-pass the supply of gas to the burners may be actively cut off when the thermostatically controlled valves are closed.

In the drawing I have only illustrated means for controlling one group of burners. The number of groups or zones of heating in an oven will depend upon the length thereof but the extent of each zone or group is not necessarily the same as the length of the oven sections before referred to.

In operating an oven provided with the control means herein described, where there are a number of breaks in the baking period, that is considerable intervals of time between successive loadings of the conveyor, the automatic diaphragm controlled valve referred to can be rendered inoperative by manipulating the manually operable valves in the by-pass pipe.

It will be understood that the drawings herein referred to are largely diagrammatic and that there can be considerable change in the details shown without departing from the invention. Except where specifically referred to in the appended claims, the invention is not to be understood as limited to the exact details shown by the drawings which are to be considered illustrative rather than restrictive of the invention.

I claim:

1. A baker's oven comprising a horizontally elongated baking chamber formed by a plurality of connected sections arranged end to end and each having sheet metal inner and outer walls, one of the sections being immovably secured to the supporting base or floor, and means supporting the other sections and permitting bodily movement thereof relative to said immovable section in the direction of the length of the oven, for the purpose described.

2. A baker's oven comprising a horizontally elongated baking chamber formed by a plurality of connected sections arranged end to end and each having sheet metal inner and outer walls, one of the sections being immovably secured to the supporting base or floor, and a series of rolls arranged beneath and supporting the other sections of the oven, substantially as and for the purpose described.

3. A baker's oven comprising a horizontally elongated baking chamber formed by a plurality of connected sections arranged end to end and each having sheet metal inner and outer walls and columns or uprights between said walls, one of the sections being immovably secured to the supporting base or floor, and a series of rolls each arranged beneath and supporting one of the columns or uprights of the other sections, whereby the last said sections may move bodily in the direction of the length of the oven relative to said immovable section.

4. A baker's oven comprising a horizontally elongated baking chamber formed by a plurality of connected sections arranged end to end, and having sheet metal inner and outer walls, one of the sections being immovably secured to the supporting base or floor, means supporting the other sections and permitting bodily movement thereof relative to said immovable section in the direction of the length of the oven, and means connecting the inner and outer walls of the movable sections to permit relative longitudinal movement between said walls.

5. A baker's oven comprising a horizontally elongated baking chamber formed by a plurality of connected sections arranged end to end and each having sheet metal inner and outer walls and columns or uprights between said walls, one of the sections being immovably secured to the supporting base or floor, the columns intermediate the side walls of the other sections each having an enlarged base or foot, floor plates beneath said columns, and antifriction rollers interposed between the floor plates and expanded bases of said columns.

6. A baker's oven comprising a horizontally elongated baking chamber formed by a plurality of connected sections arranged end to end and each including sheet metal inner and outer walls and intermediate columns or uprights, the sides of the inner wall of the oven being secured directly to said uprights, one of the sections being immovably secured to the supporting base or floor, arms extending laterally from the uprights and means connecting the outer wall of the oven to said arms and permitting relative movement between them in the direction of the length of the oven, for the purpose described.

7. A baker's oven comprising a horizontally elongated baking chamber formed by a plurality of connected sections arranged end to end and each including sheet metal inner and outer walls and intermediate columns or uprights, the sides of the inner wall being secured directly to said uprights, arms secured to the uprights and extending outwardly therefrom, and means connecting the outer wall of the oven to said arms, said means permitting relative movement between the arms and outer oven wall for the purpose described.

8. A baker's oven comprising a horizontally elongated baking chamber formed by a plurality of connected sections arranged end to end and each including sheet metal inner and outer walls and intermediate columns or uprights of channel form in cross section, the sides of the inner wall being secured directly to the uprights, arms secured to said uprights and extending outward therefrom, and means connecting the outer wall of the oven to said arms and permitting relative movement between them for the purpose described.

9. A baker's oven comprising a horizontally elongated baking chamber formed by a plurality of connected sections arranged end to end and each including sheet metal inner and outer walls and intermediate columns or uprights, the sides of the inner wall of the oven being secured directly to said uprights, and one of the sections being immovably secured to the supporting base or floor, arms secured to the uprights and extending outward therefrom, abutments on said arms bearing against the inner face of the outer oven wall, and means for clamping the outer oven wall against said abutments.

10. A baker's oven comprising a horizontally elongated baking chamber formed by a plurality of connected sections arranged end to end and each including sheet metal inner and outer walls and columns or uprights between said walls, one of the sections being immovably secured to the supporting base or floor, the columns intermediate the side walls of the other sections having the sides of the inner oven wall secured directly thereto and provided with arms extending laterally outward, floor plates beneath said columns, antifricton rolls between the floor plates and columns, and means connecting the outer oven wall to said column arms and permitting relative movement between them, for the purpose described.

11. In a baker's oven, the combination with a baking chamber, of means for heating the chamber comprising a plurality of burners, a gas supply pipe connected with all of the burners, a thermostatically controlled valve in said supply pipe, whereby the flow of gas to the burners will be varied in accordance with variations in the temperature in the baking chamber, a by-pass connecting portions of the supply pipe at opposite sides of the thermostatically controlled valve, and an automatically acting valve for regulating flow through said by-pass when the thermostatically controlled valve is closed to maintain a uniform pressure of gas in all of the burners.

12. In a baker's oven, the combination with a baking chamber, of means for heating the chamber comprising a plurality of burners, a gas supply pipe connected with all of the burners, a thermostatically controlled valve in said supply pipe, whereby the flow of gas to the burners will be varied in accordance with variations in the temperature in the baking chamber, a by-pass connecting portions of the supply pipe at opposite sides of the thermostatically controlled valve, an automatically acting valve for regulating flow through said by-pass when the thermostatically controlled valve is closed to maintain a uniform pressure of gas in all of the burners, and a manually operable valve in said by-pass between the supply pipe and said automatically acting valve.

13. In a baker's oven, the combination with a baking chamber, of means for heating the chamber comprising a plurality of burners, a gas supply pipe connected with all of the burners, a thermostatically controlled valve in said supply pipe, whereby the flow of gas to the burners will be varied in accordance with variations in the temperature in the baking chamber, a by-pass connecting portions of the supply pipe at opposite sides of the thermostatically controlled valve, an automatically acting valve for regulating flow through said by-pass when the thermostatically controlled valve is closed to maintain a uniform pressure of gas in all of the burners, and a pilot light adjacent each burner and independently connected to the supply pipe.

14. In a baker's oven, the combination with a baking chamber, of means for heating the chamber comprising a plurality of burners, a gas supply pipe connected with all of the burners, a thermostatically controlled valve in said supply pipe, whereby the flow of gas to the burners will be varied in accordance with variations in the temperature in the baking chamber, a by-pass connecting portions of the supply pipe at opposite sides of the thermostatically controlled valve, an automatically acting valve for regulating flow through said by-pass when the thermostatically controlled valve is closed to maintain a uniform pressure of gas in all of the burners, a pilot light adjacent each burner and independently connected to the supply pipe, a manually operable valve controlling supply of gas to each pilot light, and a manually operable valve in said by-pass between the supply pipe and the automatically acting valve.

15. In a baker's oven, the combination with a horizontally elongated baking chamber, of a series of burners for heating the oven arranged in a plurality of groups, a header connecting the burners of each group, a gas supply pipe having an independent connection with each header, a thermostatically controlled valve in each of the connections between the supply pipe and headers, whereby the flow of gas to the burners of each group will be varied in accordance with variations in the temperature in the section of the oven heated by that group, a by-pass connecting the supply pipe with each header about the thermostatically controlled valve of that header, and an automatically acting valve for regulating flow through each said by-pass when the associated thermostatically controlled valve is closed, for the purpose described.

In testimony whereof I have hereunto set my hand.

CORRY B. COMSTOCK.